Patented Apr. 28, 1942

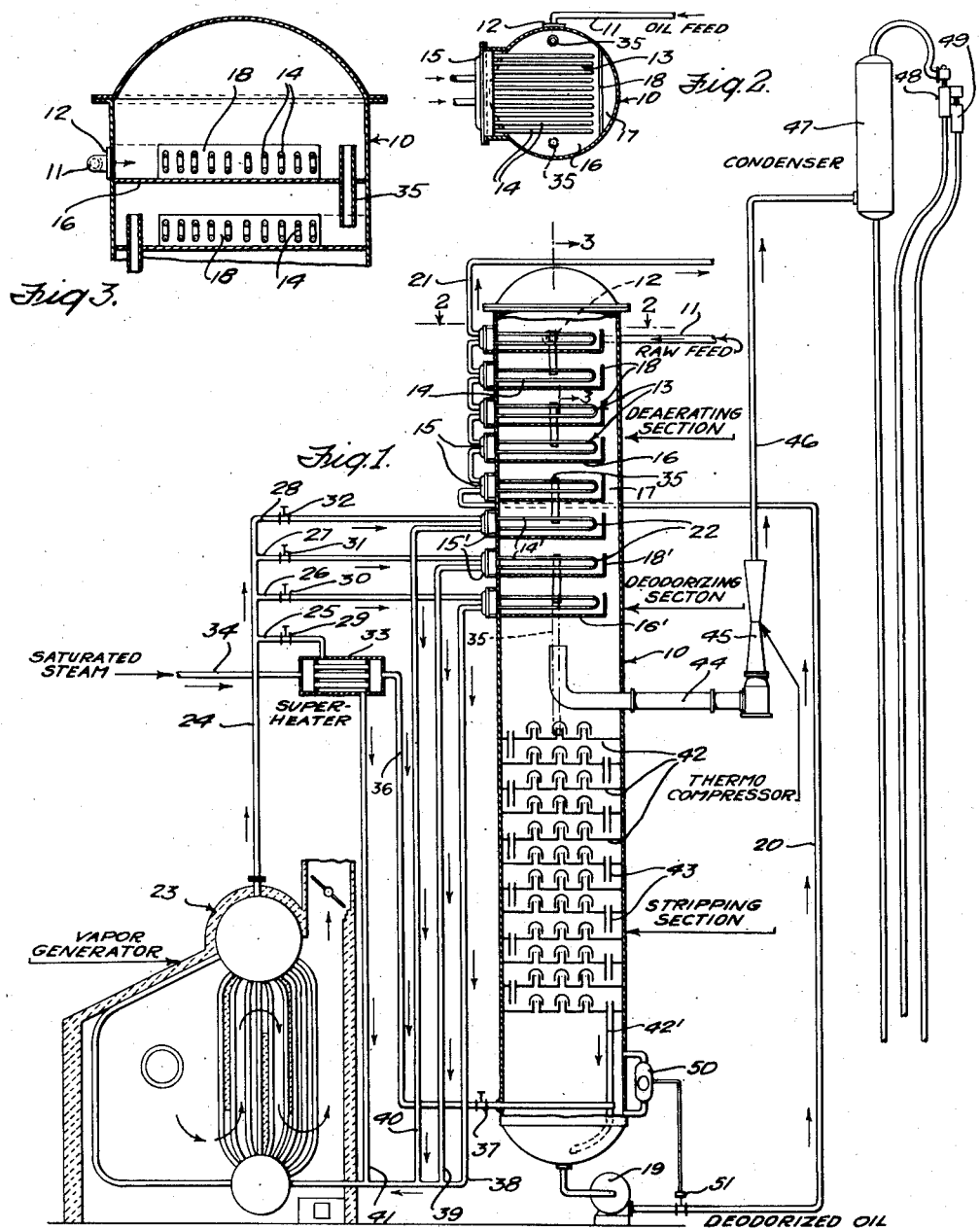

2,280,896

UNITED STATES PATENT OFFICE 2,280,896

DEODORIZATION OF ANIMAL AND VEGETABLE OILS

Dion K. Dean, Rahway, N. J., assignor to Foster Wheeler Corporation, New York, N. Y., a corporation of New York Application July 22, 1937, Serial No. 154,994

11 Claims. (Cl. 260—428)

My invention relates to the art of refining oils, and more particularly to an improved process of and apparatus for the continuous deodorization of animal oils and vegetable oils and the like. The deodorization of such oils is mainly for the purpose of producing certain edible products by the removal from the raw oil of dissolved air and other undesirable volatile constituents, that if not removed, would adversely affect the product with respect to color and taste, or cause rapid deterioration.

Heretofore, the generally accepted method of deodorization of such oils has been by the batch systems in which a tank is filled with a charge of the raw oil, and is thereupon subjected to the desired operating vacuum and then heated by means of heating coils within the tank, while at the same time stripping steam is forced through the body of oil. By this method the temperature is gradually built up to the maximum in the presence of vacuum, and consequently some of the volatile constituents including air are released and escape from the oil before it attains its maximum temperature. This is an advantage to the extent that the oil is not highly heated in the presence of oxygen and thus tends to prevent oxidation. However, heating the oil in bulk is a relatively slow process and has the disadvantage that certain other chemical changes may take place as the result of the extended heating period. Also, only the topmost part of the oil is subjected to full vacuum since all other portions of the body of oil are under some hydrostatic head. The action of the direct stripping steam will, of course, cause a circulation of the oil and thereby eventually bring all particles to the top surface, but this takes considerable time so that the deodorization period is undesirably extended, with the bad results referred to.

Various attempts have been made to make use of a continuous system of deodorization by heating the raw oil and then exposing it successively in relatively thin layers of large area to sub-atmospheric pressure, while at the same time contacting the oil with stripping steam, with the thought that complete deodorization might thus be brought about in a much shorter period of time than would be the case with a batch system, thereby minimizing the deleterious chemical reactions produced by subjecting the body of the oil to a prolonged high temperature heating. Generally, these continuous systems have not proven highly successful since they have lacked the one desirable element inherent in the batch system, namely, the initial release of the air and certain undesirable volatile constituents at low temperature.

In the process disclosed in my copending United States application Serial No. 129,980, filed March 10, 1937, I overcome the aforementioned disadvantages by causing the raw oil, which is to be deodorized to pass continuously through a preliminary deaerating chamber before being heated at all, or before being heated to a sufficient temperature to cause any adverse chemical effect, whereby a portion of the vapors and especially the air, are removed before the oil undergoes the high temperature treatment necessary to complete deodorization. With such a method, steam consumption and operating costs are reduced as compared with prior methods, and the size of the apparatus required for carrying out the method is reduced, and the cost thereof is correspondingly less.

My present invention contemplates a further improvement in the location and arrangement of the heating elements with respect to the liquid undergoing treatment in both the deaerating and deodorizing sections of the apparatus employed. In accordance with the invention I place all the heating surface within a vacuum chamber in such a way that the oil, at all stages of a gradual heating period, is directly exposed to a high vacuum, which very materially reduces the possibility of oxidation, and increases the efficiency of the system as a whole.

For a better understanding however, of the particular features that characterize my invention, reference may be had to the following description considered in connection with the accompanying drawing, and in which:

Fig. 1 is a vertical sectional view illustrating diagrammatically a preferred form of apparatus for carrying out my improved process;

Fig. 2 is a transverse sectional view taken on line 2—2 of Fig. 1, and

Fig. 3 is a partial vertical sectional view taken on line 3—3 of Fig. 1.

Like characters of reference refer to like parts throughout the several views.

Referring to the drawing, particularly to Fig. 1, the column or tower 10 comprises a deaerating and primary heating section, a deodorizing and final heating section, and a bubble tray or stripping section. The raw oil to be deodorized is supplied through conduit 11, and enters the top of column 10 through inlet connection 12. A plurality of heating elements 13 each consisting of a group of return bend tubes 14, which are connected at their ends to headers 15 are supported within the deaerating section on trays 16. An open space 17 for the passage of vapors is provided between the inner wall of column 10 and each tray, and is formed by the dams or upturned tray portions 18. A withdrawal pump 19 conducts the finished product through conduit 20 to the lowermost header 15 of the group of heating elements 13. This oil flows through the return bends 14 and the upper headers 15 to the topmost heating element 13, and is then discharged through conduit 21 to a point of storage after passing through a cooler, if desired. Directly below the heating elements 13 is a similarly arranged and supported group of heating elements 22 which form the deodorizing and final heating section. Reference character 23 designates generally a boiler or vapor generator for a high boiling point liquid such as diphenyl, diphenyl oxide, or an equivalent, to be used as a heating medium in this section, and for superheating the stripping steam used in the process. Vapor from the boiler 23 flows through conduit 24 and enters lines 25, 26, 27 and 28, while the valves 29, 30, 31 and 32 respectively, control the vapor flow therethrough to a steam superheater 33 of the shell and tube type, and to each of the heating elements 22. A supply of saturated steam is delivered to the superheater 33 through conduit 34. Downcomers 35 are alternately arranged in either side of each of the succeeding trays 16 and 16' of the deaerating and deodorizing sections respectively. Superheated steam from the superheater 33 is conducted to the bottom of column 10 through conduit 36, the flow through which is controlled by valve 37. The heating vapor that has been cooled or condensed by its passage through the heating elements 22 and the superheater 33 is returned to the boiler 23 by return lines 38, 39, 40 and 41 to be reheated and again vaporized in a continuous cycle.

A plurality of bubble trays 42 located in the lower portion of the column comprise the stripping section. Downcomers 43 are arranged to maintain the desired liquid level on each of the trays as the oil flows downwardly over the bubble trays to the bottom of the column. A vapor line 44 extends from a point within the column between the lowermost heating element 22 and the topmost bubble tray 42 to the suction end of a thermo-compressor 45 which discharges into vapor line 46 leading to a barometric condenser 47. Non-condensible vapors and/or gases are disposed of by a two-stage air pump comprising an inter-condenser 48 and an after-condenser 49.

The operation of the apparatus illustrated and described herein is as follows: The charge or raw oil to be deodorized after entering the deaerating section through the inlet connection 12 at the top of the column, first flows over the tubes of the topmost heating element 13. A body or pool of oil of sufficient depth to cover the tubes 14 of the elements 13 is maintained on the trays 16 by the dams 18, and by the elevated position with respect to the surface of each tray of the inlet or upper ends of the downcomers 35. It will be perceived therefore, that in normal operation the lower or outlet ends of the downcomers will extend below the surface of the liquid level on each tray. As the oil undergoing treatment flows across succeeding trays from the outlet of one downcomer to the inlet of another in its passage downwardly through the section, its temperature will be progressively and gradually raised by contact with the outer surface of the tubes through which the relatively high temperature finished product is forced by the withdrawal pump 19, the flow of the finished product being counter-current to that of the descending charge, and thus valuable heat is recovered that otherwise would be lost. At the same time certain vapors and gases including air are released from the oil as it is heated, and also due to the reduced pressure within the section produced by the thermo-compressor 45. These vapors and/or gases are drawn downwardly through the space 17 by the high vacuum to the inlet of vapor line 44 and thence to the suction of the compressor, by which they are removed from the column and discharged to the condenser.

From the deaerating section the oil passes directly to the deodorizing and final heating section. The heating elements 22 are identical in form to the elements 13, each comprising a group of return bend tubes 14' connected at their ends to a header 15' and supported by a tray 16' including a dam or upturned portion 18'. However, since the vapor that enters and flows through the tubes 14' from the vapor generator 23 is at a considerably higher temperature than the heating medium supplied to the tubes 14, the temperature of the oil flowing over the heating elements 22 will be correspondingly increased, and the oil will give up additional undesirable volatile constituents of higher boiling points than those that were released in the deaerating section. The heating of the oil is, of course, gradual as it flows from the top to the bottom of each section, and its flow is downward and parallel to that of the vapors and/or gases. Therefore care should be taken to so limit the area of the space 17 that the velocity of the lower boiling point vapors in their downward course to the vapor line 44 will be greater than the diffusion rate of any of the released higher boiling point vapors so as to prevent a back flow of higher boiling point vapors that would result in their condensation by the cooler oil in an upper stage of either section, and a consequent internal refluxing action that would impair the efficiency of the process.

The valves 30, 31 and 32 may be employed to regulate the quantity of the heating medium flowing through the conduits 26, 27 and 28 respectively, to the heating elements 22 in accordance with desired temperature conditions in the deodorizing section. In the stripping section the oil flows over the trays 42 and downwardly through the downcomers 43 and 43' to the bottom of the column where an adequate liquid level may be automatically maintained by the cooperative effect of the float control 50 and valve 51. Superheated steam introduced through conduit 36 flows upwardly through the stripping section in contact with the descending liquid. The steam together with any additional volatile constituents which may be released by the stripping action of the steam, are withdrawn and discharged through the thermo-compressor.

It is apparent from the foregoing description that the oil being treated is subjected to a high vacuum during all stages of the heating period, and that therefore the possibilities of oxidation are greatly reduced since dissolved air and other undesirable vapors or gases are continuously released from the first stage of the deaerating section and throughout the subsequent stages of both the deaerating and deodorizing sections of the column. Furthermore, the removal of the released vapors and air is in a direction parallel to the flow of the oil so as to avoid the condensation and refluxing of any of the released vapors within the tower.

Although a preferred form of my invention is herein illustrated and described, it is to be understood that certain modifications therein may be made without departing from the invention, for example, reheating elements may be introduced between or on the trays of the stripping section to make up for radiation and evaporation heat losses so as to maintain the full desired temperature throughout the tower, and automatic regulation may be provided to maintain desired temperature and pressure conditions within the tower. Accordingly, it will be understood that the invention is not to be limited except by the scope of the appended claims.

What is claimed is:

1. The process of continuously deodorizing animal or vegetable oils which comprises continuously introducing the oil into a treating zone, maintaining a vacuum in said zone, progressively heating the oil in a first portion of the zone to deaerate the oil by passing it counter-current to and in indirect heat exchange relationship with heated deodorized oil withdrawn from said zone, progressively heating the deaerated oil to a higher temperature in another portion of the zone by indirect heat exchange relationship with a separate heating medium to remove high boiling constituents and thereby deodorize the oil, passing the heated deodorized oil through a further portion of said zone in contact with a stripping medium, withdrawing from said zone the vaporous constituents removed from the oil and the stripping medium at an outlet so disposed that said constituents removed in the first and other portions of said zone flow concurrently with the oil in passing therethrough, and continuously removing the deodorized and stripped oil from said zone.

2. The process of continuously deodorizing animal or vegetable oils which comprises continuously introducing the oil into a treating zone, maintaining a vacuum in said zone, progressively heating the oil in a first portion of the zone to deaerate the oil by passing it counter-current to and in indirect heat exchange relationship with heated deodorized oil withdrawn from said zone, heating a high boiling point fluid outside said zone, progressively heating the deaerated oil to a high temperature in another portion of the zone by indirect heat exchange relationship with said heated high boiling point fluid to remove high boiling constituents and thereby deodorize the oil, continuously withdrawing from said zone the vaporous constituents removed from the oil at an outlet so disposed that said constituents flow concurrently with the oil in said zone, and continuously removing the deodorized oil from said zone.

3. The process of continuously deodorizing animal or vegetable oils which comprises continuously introducing the oil into a treating zone, maintaining a vacuum in said zone, providing a plurality of superposed pools of the oil in a first and another portion of said zone, causing the oil introduced in said zone to flow downwardly therein from pool to pool, progressively heating the oil in its passage through said pools in the first portion of said zone to deaerate the oil by passing it counter-current to and in indirect heat exchange relationship with heated deodorized oil withdrawn from said zone, progressively heating the deaerated oil to a higher temperature in said other portion of said zone in its passage through the pools therein by indirect heat exchange relationship with a separate high boiling point fluid to remove high boiling constituents and thereby deodorize the oil, withdrawing from said zone the vaporous constituents removed from the oil at an outlet so disposed that said constituents flow concurrently with the oil in said zone, and continuously removing the deodorized oil from said zone.

4. The process of continuously deodorizing animal or vegetable oils which comprises continuously introducing the oil into a deaerating zone, maintaining a vacuum in said zone, progressively heating the oil in said zone by passing it counter-current to and in indirect heat exchange relationship with heated deodorized oil, continuously withdrawing the vaporous constituents removed from the oil in said zone at a point so disposed that said vaporous constituents flow concurrently with the oil in said zone, and subsequently deodorizing the oil by subjecting it to the heat of a different heating medium and to vacuum and to a stripping medium to remove odorous constituents from the oil.

5. Apparatus for the continuous deodorization of animal or vegetable oils comprising means forming a treating chamber, means for producing and maintaining a vacuum in said chamber, means for continuously introducing oil into said chamber, means for progressively heating the oil in its passage through a first portion of the chamber to deaerate the oil including fluid conducting tubes in contact with the oil in said portion, means for passing heated deodorized oil withdrawn from said chamber through said tubes, said tubes being arranged so that the oil therein flows counter-current to the oil in contact therewith, means for progressively heating the deaerated oil to a higher temperature in another portion of the chamber to remove high boiling constituents and thereby deodorize the oil including heating surface in contact with the oil in said portion, means for heating said surface by a separate heating medium, the arrangement being such that the vaporous constituents removed from the oil in said chamber flow concurrently with the oil therein, means for continuously withdrawing the vaporous constituents from said zone, and means for continuously removing the deodorized oil from said zone.

6. Apparatus for the continuous deodorization of animal or vegetable oils comprising means forming a treating chamber, means for producing and maintaining a vacuum in said chamber, means for continuously introducing oil into said chamber, means for progressively heating the oil in its passage through a first portion of the chamber to deaerate the oil including fluid conducting tubes in contact with the oil in said portion, means for passing heated deodorized oil withdrawn from said chamber through said tubes, said tubes being arranged so that the oil therein flows counter-current to the oil in contact therewith, means for progressively heating the deaerated oil to a higher temperature in another portion of the chamber to remove high boiling constituents and thereby deodorize the oil including heating surface in contact with the oil in said portion, means for heating said surface by a separate heating medium, the arrangement being such that the vaporous constituents removed from the oil in said chamber flow concurrently with the oil flowing through the first and other portions of the chamber, means in a further portion of said chamber for passing the deodorized oil in contact with a stripping medium, means for continuously withdrawing the vaporous constituents and the stripping medium from said zone, and means for continuously removing the deodorized oil from said zone.

7. Apparatus for the continuous deodorization of animal or vegetable oils comprising means forming a treating chamber, means for producing and maintaining a vacuum in said chamber, means for continuously introducing oil into said chamber, means for progressively heating the oil in its passage through a first portion of the chamber to deaerate the oil including fluid conducting tubes in contact with the oil in said portion, means for passing heated deodorized oil withdrawn from said chamber through said tubes, said tubes being arranged so that the oil therein flows counter-current to the oil in contact therewith, means for progressively heating the deaerated oil to a higher temperature in another portion of the chamber to remove high boiling constituents and thereby deodorize the oil including heating surface in contact with the oil in said portion, means for heating a high boiling point fluid outside said chamber, means for passing said fluid through said surface, the arrangement being such that the vaporous constituents removed from the oil in said chamber flow concurrently with the oil therein, means for continuously withdrawing the vaporous constituents from said zone, and means for continuously removing the deodorized oil from said zone.

8. Apparatus for the continuous deodorization of animal or vegetable oils comprising a tower, means for producing and maintaining a vacuum in the tower, a plurality of spaced, superposed trays in the tower, means for continuously introducing oil into the tower upon an upper tray therein, the trays having means causing the oil to flow downwardly from tray to tray, a fluid conducting tube associated with each tray and disposed for contact with the oil thereon, means for passing heated deodorized oil withdrawn from the tower successively through a plurality of upper trays from a lower to a higher tray counter-current to and in contact with the flow of oil over said trays whereby the oil is progressively heated and is deaerated, means for passing a separate heating medium through the tubes associated with a plurality of trays below said upper trays to heat the deaerated oil to a higher temperature to remove high boiling constituents and thereby to deodorize the oil, the trays being constructed and arranged to provide a passage within the tower through which vaporous constituents evolved from the oil on the trays will flow concurrently to the flow of oil thereover, means for continuously withdrawing the vaporous constituents from the tower, and means for continuously withdrawing the deodorized oil from the tower.

9. Apparatus for the continuous deodorization of animal or vegetable oils comprising a tower, means for producing and maintaining a vacuum in the tower, a plurality of spaced, superposed trays in the tower, means for continuously introducing oil into the tower upon an upper tray therein, the trays having means causing the oil to flow downwardly from tray to tray, a fluid conducting tube associated with each tray and disposed for contact with the oil thereon, means for passing heated deodorized oil withdrawn from the tower successively through a plurality of upper trays from a lower to a higher tray counter-current to and in contact with the flow of oil over said trays whereby the oil is progressively heated and is deaerated, means for heating a separate high boiling point fluid outside said tower, means for passing the heated high boiling point fluid through the tubes associated with a plurality of trays below said upper trays to heat the deaerated oil to a higher temperature to remove high boiling constituents and thereby to deodorize the oil, the trays being constructed and arranged to provide a passage within the tower through which vaporous constituents evolved from the oil on the trays will flow concurrently to the flow of oil thereover, means for continuously withdrawing the vaporous constituents from the tower, and means for continuously withdrawing the deodorized oil from the tower.

10. Apparatus for the continuous deodorization of animal or vegetable oils comprising a tower, means for producing and maintaining a vacuum in the tower, a plurality of spaced, superposed trays in the tower, means for continuously introducing oil into the tower upon an upper tray therein, the trays having means causing the oil to flow downwardly from tray to tray, a fluid conducting tube associated with each tray and disposed for contact with the oil thereon, means for passing heated deodorized oil withdrawn from the tower successively through a plurality of upper trays from a lower to a higher tray counter-current to and in contact with the flow of oil over said trays whereby the oil is progressively heated and is deaerated, means for heating a separate high boiling point fluid outside said tower, means for passing the heated boiling point fluid through the tubes associated with a plurality of trays below said upper trays to heat the deaerated oil to a higher temperature to remove high boiling constituents and thereby to deodorize the oil, the trays being constructed and arranged to provide a passage within the tower through which vaporous constituents evolved from the oil on the trays will flow concurrently to the flow of oil thereover, a plurality of other spaced, superposed vapor and liquid contact trays in the tower below the first mentioned trays and constructed to cause liquid to flow downwardly from tray to tray, the arrangement being such that the deodorized oil flowing from the first mentioned trays flows over said other trays, means for introducing a stripping medium into the tower below said other trays for counter-current flow in contact with the deodorized oil flowing over said other trays, a conduit having its inlet connected with the tower between the first mentioned trays and the other trays through which the vaporous constituents evolved from the oil in the tower and the stripping medium is withdrawn continuously from the tower, and means for continuously withdrawing the deodorized and stripped oil from the tower.

11. Apparatus for the continuous deodorization of animal or vegetable oils comprising means forming a chamber, means for producing and maintaining a vacuum in said chamber, means for continuously introducing oil into said chamber, means for progressively heating the oil in said chamber to deaerate the oil including fluid conducting tubes in contact with the oil in said chamber, means for passing heated deodorized oil through said tubes, said tubes being arranged so that the oil therein flows counter-current to the oil in contact therewith, a conduit having its inlet connected to the chamber through which the vaporous constituents removed from the oil are withdrawn continuously from the chamber, the inlet of the conduit being located so that said vaporous constituents flow concurrently with the oil in the chamber, and means for deodorizing the deaerated oil by subjecting it to the heat of a different heating medium and to vacuum and to a stripping medium to remove odorous constituents from the oil.

DION K. DEAN.

CERTIFICATE OF CORRECTION.

Patent No. 2,280,896.            April 28, 1942.

DION K. DEAN.

It is hereby certified that error appears in the printed specification of the above numbered patent requiring correction as follows: Page 1, first column, line 14, for the word "systems" read --system--; page 3, first column, line 17, claim 1, for "another" read --a second--; line 27, for "other" read --second--; page 4, second column, line 25, claim 10, before "boiling" insert --high--; and that the said Letters Patent should be read with this correction therein that the same may conform to the record of the case in the Patent Office.

Signed and sealed this 16th day of June, A. D. 1942.

Henry Van Arsdale,
Acting Commissioner of Patents.

(Seal)